US010502942B2

(12) United States Patent
Todd et al.

(10) Patent No.: US 10,502,942 B2
(45) Date of Patent: Dec. 10, 2019

(54) INTEGRATED ILLUMINATOR AND CONDENSER FOR MICROSCOPES (71) Applicant: Techshot, Inc., Greenville, IN (US)

(72) Inventors: Paul W. Todd, Greenville, IN (US); N. Samuel Logan, Greenville, IN (US); Michael A. Kurk, Georgetown, IN (US); Nathan A. Thomas, Louisville, KY (US); Paul Faget, Louisville, KY (US)

(73) Assignee: Techshot, Inc., Greenville, IN (US)

( * ) Notice: Subject to any disclaimer, the term of this patent is extended or adjusted under 35 U.S.C. 154(b) by 190 days.

(21) Appl. No.: 15/178,672

(22) Filed: Jun. 10, 2016

(65) Prior Publication Data

US 2016/0363753 A1     Dec. 15, 2016

Related U.S. Application Data (60) Provisional application No. 62/175,017, filed on Jun. 12, 2015.

(51) Int. Cl.
*G02B 21/12*     (2006.01)
*F21V 23/00*     (2015.01)
(Continued)

(52) U.S. Cl.
CPC ......... *G02B 21/125* (2013.01); *F21V 23/003* (2013.01); *G02B 21/02* (2013.01);
(Continued)

(58) Field of Classification Search
CPC .... G02B 21/125; G02B 21/084; G02B 21/12; G02B 21/10; G02B 21/02; G02B 21/06;
(Continued)

(56) References Cited

U.S. PATENT DOCUMENTS 4,561,731 A * 12/1985 Kley ................. G02F 1/134309
349/1
4,852,985 A    8/1989 Fujihara et al.
(Continued)

FOREIGN PATENT DOCUMENTS

CA       2441726        10/2004
DE    102004017694       9/2005
(Continued)

OTHER PUBLICATIONS

Keller, H. E., "Contrast Enhancement in Light Microscopy", from "Current Protocols in Cytometry", 1997, John Wiley & Sons, pp. 2.1.1-2.1.11.*
(Continued)

*Primary Examiner* — Evan P Dzierzynski
*Assistant Examiner* — Mitchell T Oestreich
(74) *Attorney, Agent, or Firm* — Middleton Reutlinger (57) ABSTRACT

A Light-Emitting Diode (LED) illuminator-condenser capable of supplying bright-field, dark-field, fluorescence, oblique, and phase-contrast illumination under Köhler-like conditions. A single lens may be permanently focused on the specimen plane. Illumination conditions may be made by a combination of uniform LEDs, collimating masks and diffusers. LEDs may be arranged in one or more ring-shaped patterns.

25 Claims, 5 Drawing Sheets (51) Int. Cl.
  *G02B 21/14* (2006.01)
  *G02B 21/06* (2006.01)
  *G02B 21/16* (2006.01)
  *G02B 27/30* (2006.01)
  *G02B 21/08* (2006.01)
  *G02B 21/02* (2006.01)

(52) U.S. Cl.
  CPC ............ *G02B 21/06* (2013.01); *G02B 21/08* (2013.01); *G02B 21/086* (2013.01); *G02B 21/14* (2013.01); *G02B 21/16* (2013.01); *G02B 27/30* (2013.01)

(58) Field of Classification Search
  CPC ...... G02B 21/08; G02B 21/086; G02B 21/16; G02B 21/14; G02B 27/30; F21V 23/003
  USPC ........................................................ 359/387
  See application file for complete search history.

(56) References Cited

U.S. PATENT DOCUMENTS

| | | | | |
|---|---|---|---|---|
| 5,684,625 | A | * | 11/1997 | Stankewitz .......... G02B 21/086 359/368 |
| 5,734,498 | A | * | 3/1998 | Krasieva ................ G02B 21/06 359/368 |
| 5,803,579 | A | | 9/1998 | Turnbull et al. |
| 6,963,445 | B2 | | 11/2005 | Hoover et al. |
| 7,048,402 | B2 | | 5/2006 | Roeth et al. |
| 7,502,164 | B2 | | 3/2009 | Lytle et al. |
| 8,125,709 | B2 | | 2/2012 | Hoering et al. |
| 2005/0225851 | A1 | * | 10/2005 | Koerner ............... G02B 21/086 359/388 |
| 2007/0211460 | A1 | | 9/2007 | Ravkin |
| 2008/0151368 | A1 | | 6/2008 | Weiss |
| 2009/0034248 | A1 | * | 2/2009 | Rudolph .................. F21K 9/00 362/230 |
| 2009/0224694 | A1 | | 9/2009 | Horing et al. |
| 2010/0259816 | A1 | * | 10/2010 | Feger ................... G02B 21/084 359/385 |
| 2012/0013726 | A1 | | 1/2012 | Thorburn |

FOREIGN PATENT DOCUMENTS

| | | | |
|---|---|---|---|
| DE | 102005030761 | | 1/2007 |
| WO | 2014001413 | | 1/2014 |
| WO | 2014041820 | | 3/2014 |
| WO | WO 2016145476 A1 | * | 9/2016 ........... G02B 21/084 |

OTHER PUBLICATIONS

European Patent Office, International Search Report and Written Opinion for PCT/US2016/036814, dated Sep. 26, 2016.
Guoan Zheng, Christopher Kolner, and Changhuei Yang, "Microscopy refocusing and dark-field imaging by using a simple LED array," Optics Letters 36 (20), 3987-3989 (2011).
AMSCOPE; SKU: T120B-P, 2000X LED Lab Trinocular Compound Microscope w 3D Mechanical Stage + USB2 Camera, Oct. 24, 2014. (Retrieved from Internet Wayback Machine on May 23, 2018.).
AMSCOPE: SKU: T640-FLLED-B1, 100X-1000X Infinity Plan Trinocular Research-Grade Microscope System with Blue LED Fluorescence Kit, May 20, 2017. (Retrieved from Internet Wayback Machine on May 23, 2018.).
Zheng, Guoan et al., Microscopy refocusing and dark-field imaging by using a simple LED array, Optics Letters, vol. 365, No. 20, pp. 3987-3989, Oct. 15, 2011.
Marzhauser Wetzlar, LED 100, Jul. 16, 2013. (Retrieved from Internet Wayback Machine on May 23, 2018.).
Leica Microsystems, LEICA DM1000—3000 Ergonomic System Mircroscopes Manual, Aug. 2014.
OPTIKA Microscopes, B-380 Phase Contrast.
OPTIKA Microscopes, B-380 Series Laboratory Upright Microscopes Catalogue, Mar. 2017.
NIKON Eclipse E200 Student Microscope, Oct. 2, 2015. (Retrieved from Internet Wayback Machine on May 23, 2018.).

* cited by examiner

INTEGRATED ILLUMINATOR AND CONDENSER FOR MICROSCOPES

FEDERALLY SPONSORED RESEARCH

This invention was made with government support under project NNX11CA56C awarded by National Aeronautics and Space Administration (NASA). The Government has certain rights in the invention.

BACKGROUND

1. Field

The invention relates to methods of illuminating a specimen in light microscopy. In particular it relates to methods of illumination in various modes, such as bright-field, phase contrast, dark-field, and fluorescence microscopy.

2. Prior Art

LED light sources for microscopes have become plentiful, but very few have been integrated into condensers. Several original shortcomings, such as uncontrolled spectral distribution and low intensity have been overcome, and it is now possible to assume that nearly any classical source of microscope illumination, arc, filament, halogen etc. lamps are replaceable by LEDs or combinations of LEDs.

Three major methods of illumination for microscopes are critical illumination, diffuse illumination, and Köhler illumination. In critical illumination, an image of the light source is focused by a condensing lens on the specimen plane, mainly to maximize brightness. In diffuse illumination, the specimen is illuminated by light that has passed through, for example, a translucent layer that eliminates images, with or without a condenser lens, at the specimen plane. In Köhler illumination, a combination of lenses, typically four, is used to defocus the image of the light source and provide intense uniform, focused illumination at the specimen plane.

Köhler illumination is a method of specimen illumination used for transmitted and reflected light (trans- and epi-illuminated) optical microscopy. Köhler illumination acts to generate an extremely even illumination of the sample and ensures that an image of the illumination source (for example a halogen lamp filament) is not visible in the resulting image. Köhler illumination is the predominant technique for sample illumination in modern scientific light microscopy. Köhler illumination, by definition, provides a uniform light field in the specimen plane by focusing the source at the back focal plane of the objective lens. In old and/or simple microscopes a single condenser lens projects an image of the illuminator lamp, often a helical filament, on the specimen plane, thereby producing a confounded combined image of both the specimen and the lamp. Classically, this condition is called critical illumination. In 1893 August Köhler designed a method of illumination which produced a perfectly defocused image of the light source at the sample plane.

A typical light path in a modern microscope includes two iris diaphragms, or apertures, positioned so that one controls the size of the field illuminated and the other controls the amount of light reaching the specimen plane. The operator has numerous adjustments to consider: centering the light source, axially positioning the light source, controlling light source intensity, positioning the condenser (condensing lenses) between the light source and the specimen, centering the condenser, focusing the condenser on the specimen plane (Abbe condenser), and adjusting two apertures for brightness and uniformity of brightness across the specimen plane (Köhler illumination). The application of LEDs to microscope illumination facilitates the elimination of several of these adjustments.

SUMMARY

In typical compound light microscopes illumination for bright-field observation is achieved through an adjustable iris-diaphragm aperture, phase contrast through one of three interchangeable annular masks that must be aligned, and dark field observation are each selected by the rotation of a multi-position turret or the sliding of a slide bar. The apparatus disclosed eliminates all condenser-related moving parts, including those involved in changing illumination mode (bright-field, dark-field, phase contrast, oblique and fluorescence illumination). Further, the insertion of wavelength filters for phase contrast and fluorescence excitation is also eliminated thereby preserving the original intensity of the illumination source.

The above features function best when illumination is as uniform across the specimen plane as possible. For this purpose "Pseudo Köhler Illumination" is employed in the apparatus. Today's off-the-shelf microscopes typically provide a system of condenser lenses that facilitates the achievement (by the operator) of Köhler Illumination. In today's microscopes this illumination is typically achieved by a combination of four lenses and two (usually adjustable) apertures. The operator focuses the lenses as pairs and adjusts the apertures until a satisfactory illumination is achieved. The apparatus ideally uses minimal space, requires no adjustments and no operator to achieve Köhler illumination. To achieve this, a combination of uniform light sources, fixed apertures, and a single, carefully-chosen condensing lens was assembled to provide very nearly uniform illumination of the sample plane in bright-field, dark-field, and illumination for several levels of phase-contrast magnification with phase-contrast sources focused at the back focal plane of the microscope's objective lens as needed for Köhler illumination. For this the term pseudo Köhler illumination is adopted.

One purpose of Köhler illumination is to prevent the image of the light source from appearing in the specimen plane and thereby produce what appears to be uniform-intensity illumination in the specimen plane. Pseudo-Köhler illumination serves this purpose without the complex combination of adjustable lenses and apertures required to achieve uniform, image-free illumination. Collimated light is light whose rays are parallel, and therefore will spread minimally as it propagates. The word is related to "collinear" and implies light that does not disperse with distance (ideally), or that will disperse minimally (in reality). A perfectly collimated beam, with no divergence, cannot be created due to diffraction. But light can be approximately collimated by a number of processes, for instance by means of a collimating mask. Perfectly collimated light is sometimes said to be focused at infinity.

As used herein, the term "illuminator" is intended to mean a source of light. "Condenser" is intended to mean an apparatus for illuminating a sample on a microscope stage under various physical optical conditions. "Mask" is intended to mean a means of limiting the size and shape of a beam of light. "Specimen" refers to an object on a microscope stage. "Specimen plane" is intended to mean the position of the specimen or a plane occupied by the specimen along a light path. "LED" or "diode" is intended to mean Light Emitting Diode. A "diode ring", "LED ring" or "ring" is intended to mean a ring-shaped array of light emitting diodes. Ring-shaped arrays of light-emitting diodes are utilized in the present embodiment.

In the preferred embodiment pseudo-Köhler illumination is achieved by the following:

1. Planar source (LED is 2-dimensional and presents only 1 object plane for the condenser lens)
2. Fixed-geometry field diaphragm selects LED-emitted parallel light, and no collector lens is required.
3. Edges of the planar source do not enter the source image, and no aperture diaphragm is required.
4. A thin-layer diffuser is placed between the source and field diaphragm.
5. In the case of phase-contrast illumination the field diaphragm is a fixed mask that also defines the illumination ring and collimates the illumination.

The apparatus achieves several advantages. First, it has low power consumption. While this is true of any LED-based illuminator, the fact that a single bright light source is not used for all functions (wasting photon power) in the apparatus, and different LEDs being on for different functions actually reduces power requirement, typically to less than 10 Watts at any given time. There are no wavelength filters so no photons are wasted.

Second, it is very easy to operate. The single condenser lens is focused by the operator or fixed in position in the case of an integrated microscopy system. All other functions are performed through a graphical user interface by mouse clicks or touch screen or a controller box with switches.

Third, it has no moving parts. A conventional professional condenser requires the user to adjust one or two iris diaphragms, a rotating turret or slide bar and their position in the x-y plane. No adjustments are required to achieve pseudo Köhler illumination. Pseudo-Köhler illumination is established by incorporation of a fixed-geometry field diaphragm that selects LED-emitted parallel light, and no collector lens is required.

Fourth, the apparatus is employable and applicable to multiple commercial microscopes. A small mounting cylinder beneath the circuit housing fits the condenser mounting ring of various microscopes.

Fifth, it provides multiple illuminator functions. Bright-field, dark-field, fluorescence, and two or three levels of phase contrast illumination are available at the touch of a button or computer mouse.

Sixth, it is quite compact. The overall width is less than that of a conventional turret condenser, and the height can be is little as 4.5 cm including light sources.

Seventh, is has a long lifetime. Typical LED lifetimes are 25,000 hours of operation, and lamp replacement and illuminator re-alignment will never be necessary.

In one embodiment, a Light-Emitting Diode (LED) illuminator-condenser with no moving parts, which is capable of supplying bright-field, dark-field, fluorescence, oblique, and phase-contrast illumination under Köhler-like conditions. The vertical space occupied may be less than 45 mm, and the single lens is permanently focused on the specimen plane. Any phase-contrast objective lens focused on the specimen will be correctly aligned with the illuminator-condenser phase rings for Phase I (10×, 20×), Phase II (40×, 63×), or Phase III (100×) for phase contrast viewing. The user selects Phase I or Phase II illumination rings using a switch, keyboard or computer mouse. All modes are selected from a keyboard, mouse, or touch screen. There are no knobs or turrets. Illumination conditions are made uniform by a combination of uniform LEDs, collimating masks and diffusers. Fluorescence illumination design follows that of commercial LED ring illuminators. This configuration is known as "offset excitation". The ring includes UV (ca. 365-405 nm) or blue (ca. 470-488 nm) photodiodes to provide excitation wavelengths using the same geometry as is used for dark-field illumination. In this configuration the light from an outer ring of several directed diodes is directed to converge at the focal plane while not entering the objective lens.

In one embodiment, an integrated illuminator and condenser for microscopes may include one or more of at least one convergent lens, at least one multiwavelength light-emitting diode for bright field illumination, a ring of green light-emitting diodes for low-magnification phase contrast illumination, at least one ring of green light-emitting diodes for high-magnification phase contrast illumination, a ring of multiwavelength light-emitting diodes for dark field illumination, at least one ring of single-wavelength light-emitting diodes for fluorescence illumination, and one or more light-absorbing masks to collimate light from one or more of the rings of light-emitting diodes.

Further in one or more embodiments, the ring of green light-emitting diodes for low-magnification phase contrast illumination is of a diameter as to correspond to the quarter-wave retardation-plate rings of 10× and 20× phase-contrast microscope objective lenses. At least one ring of green light-emitting diodes for high-magnification phase contrast illumination is of a diameter as to correspond to the quarter-wave retardation-plate rings of 40× or higher-magnification phase-contrast microscope objective lenses. The ring of multiwavelength light-emitting diodes for dark-field illumination is of a diameter and includes individual light-emitting diodes so directed as to illuminate specimens with light that is obliquely incident at the specimen plane. The ring of single-wavelength light-emitting diodes for fluorescence illumination is of a diameter and includes individual light-emitting diodes so directed as to illuminate specimens with light that is obliquely incident at the specimen plane. The ring of single-wavelength light-emitting diodes for fluorescence illumination emits light having a wavelength that is capable of exciting fluorescence in specimens. The light-absorbing masks form rings that define and collimate light incident on the converging lens. The switching of modes is accomplished by means of electrical switches. The switching of modes is accomplished by means of a computer, with the computer being connected by cable or by wireless means. The computer is operated by screen commands using a graphical user interface. A ring of a plurality of multi-wavelength light-emitting diodes may be used for bright field illumination.

Further in one or more embodiments, illumination is established that provides uniform illumination in the specimen plane and an image of the light source focused at the back focal plane of a microscope objective lens. The uniform illumination is established using a planar LED source presenting only one object plane for the condenser lens to image at the object plane of the microscope objective lens. The uniform illumination is established using a fixed-geometry field diaphragm that selects LED-emitted parallel light without a collector lens. The uniform illumination is established without use of a collector lens. The uniform illumination is established in which the edges of the planar light sources are not included in the source image. The uniform illumination is established without the use of an aperture diaphragm. The uniform illumination is established by the inclusion of a thin layer of light-diffusing material. The uniform illumination is established for phase-contrast microscopy by shaping the field diaphragm using ring-shaped masks to define a ring of illumination. An image of a shaped source of LED illumination is established at the back focal plane of a phase-contrast microscope objective.

Another embodiment, one or more of the light-emitting diodes are an organic LED (OLED) display plane. The OLED display plane is controlled by computer to produce at least one of bright-light, phase contrast, dark-field and fluorescence illumination. The OLED display plane is controlled by computer to produce light-source images having various shapes. The OLED display plane may be controlled by computer to produce light-source images having various shapes suitable for bright field, dark field, phase contrast and fluorescence excitation illumination. The OLED display plane is controlled by computer to produce light-source images having various spectra. The OLED display plane is controlled by computer to produce light-source images having various spectra suitable for bright field, dark field, phase contrast and fluorescence excitation illumination.

In one embodiment, a mounting cylinder is provided below its circuit board for the purpose of mounting the illuminator condenser to the condenser carrier of a conventional microscope. A mounting cylinder may be provided above its circuit board for the purpose of mounting the illuminator condenser to the condenser carrier of a conventional microscope. The integrated illuminator and condenser combined within a microscope.

BRIEF DESCRIPTION OF THE FIGURES

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
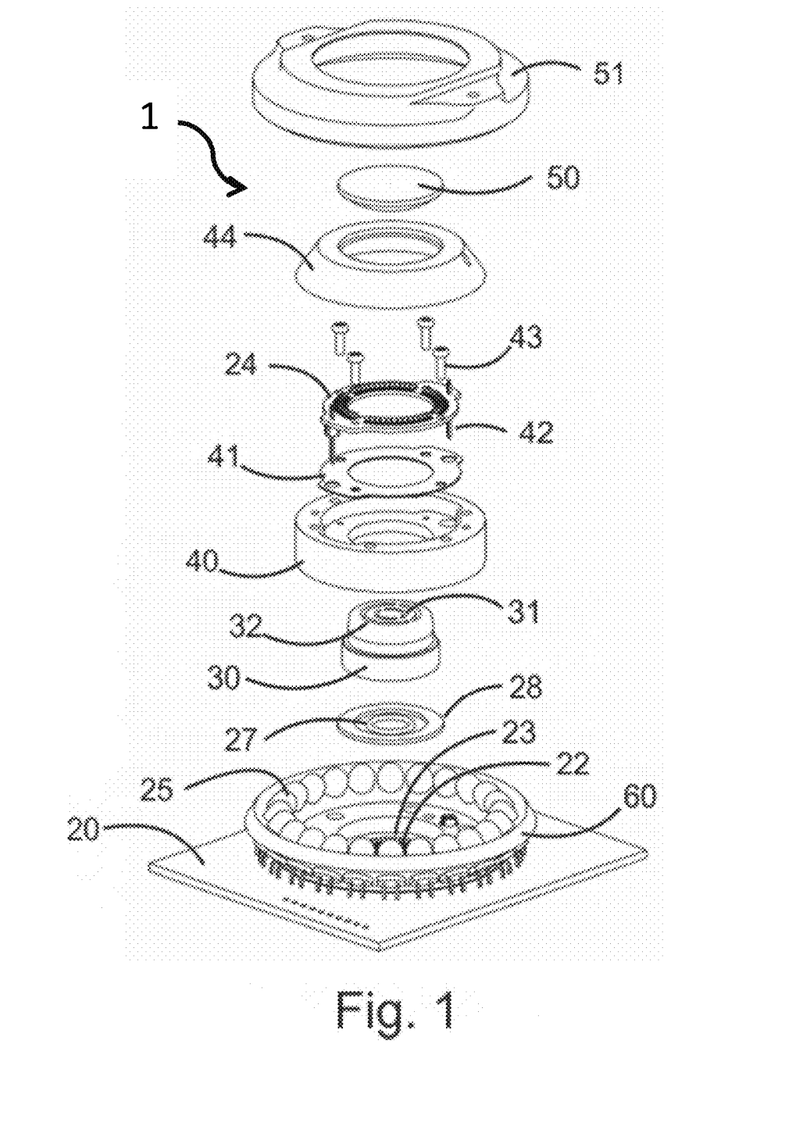
FIG. 1 is an exploded view of a preferred embodiment.

A preferred embodiment of the present invention is best understood by referring to the drawings. FIG. 1 is a drawing of an exploded view of the preferred embodiment of the invention 1. At the base of the embodiment is a printed circuit board 20 with at least one, and as many as desired, patterns of circularly disposed light emitting diodes. The circular patterns of diodes, in the preferred embodiment, include, but are not limited to, an inner ring of monochromatic diodes 22 to be switched on, typically when a Phase I contrast objective lens is used in the microscope to which the apparatus 1 is attached, a second ring of diodes 23 to be switched on when a Phase II contrast objective lens is used, a third ring of multiwavelength diodes 24 to be switched on when bright-field illumination is desired, and a fourth or outermost ring of diodes 25 to be switched on for dark-field illumination or fluorescence illumination, the diodes emitting multiwavelength light for dark-field illumination and selected wavelengths of monochromatic light based on monochromatic LEDs interspersed in said ring or LEDs with selectable emission wavelengths for the excitation of fluorescence in specimens. The inner diode rings 22 and 23 are covered by thin-layer diffusers of their light 27 and 28, respectively. The diffused light from these rings of diodes is collimated by collimator 30, which has corresponding inner 31 and outer 32 circular slits to collimate the light from inner diode ring 22 and outer diode ring 23, respectively. This combination is so positioned as to provide pseudo-Köhler phase-contrast illumination that is monochromatic and incident on the quarter-wave retardation-plate rings of the microscope's phase-contrast objective lenses. The third diode ring 24 in this embodiment is positioned above the common plane of other diode rings by a standoff collar 40 and a spacer 41 and is attached using locator pins 42 and screws 43. The light from diode ring 24 is collimated, to the extent necessary, by non-reflective collar 44. All of the illumination patterns from diode rings 22, 23 and 24 are focused at the specimen plane of the user's microscope through a single plano-convex lens 50, which is held rigidly in place by outer collar 51, which also anchors the other components of the optical stack and serves, in combination with collar 44 as collimator for the outermost ring of diodes 25. The diodes that constitute the outermost illumination ring 25, for fluorescence and dark-field microscopy, are positioned and collimated by outer collar 60.

Figure 2A:
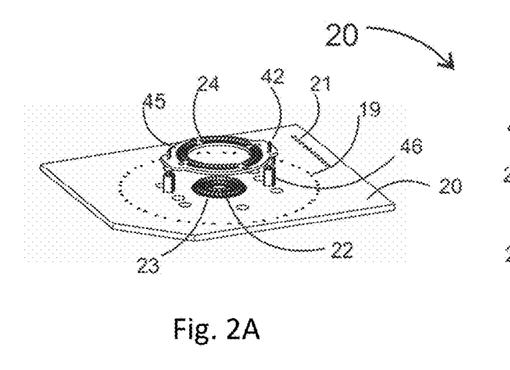
FIG. 2A is a perspective view of a circuit board showing LED placement in a particular embodiment.
Figure 2B:
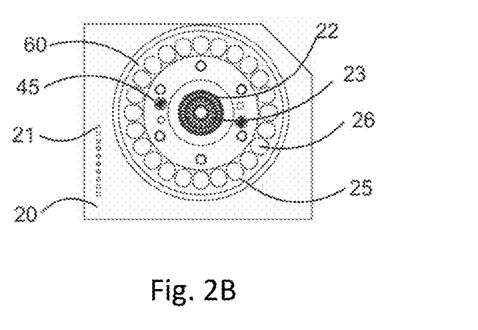
FIG. 2B is a top view of the circuit board of FIG. 2A, rotated 180 degrees.

A circuit-board layout for the positioning of light emitting diodes to accomplish their various purposes is illustrated in an isometric representation in FIG. 2A and a plan-view in FIG. 2B. The base circuit board 20 provides multiple connections 21 to the rings of diodes. In the embodiment shown the innermost ring 22 may include 16 diodes emitting green light for low-magnification phase contrast; the second ring 23 may include 36 diodes emitting green light for high-magnification phase contrast, and the outermost ring 25 may include 24 encapsulated photodiodes 26, connected via through-holes 19, which may emit multiwavelength or monochromatic light and which are positioned and collimated by non-reflecting collar 60. A ring of, in this case, 52 multiwavelength LEDs used for bright-field illumination 24 is circularly positioned on its own circuit board 45 on stand-offs 46 by guidepins 42 above the plane of the base circuit board 20 in such a position as to optimally and uniformly illuminate a microscope specimen plane.

Figure 3:
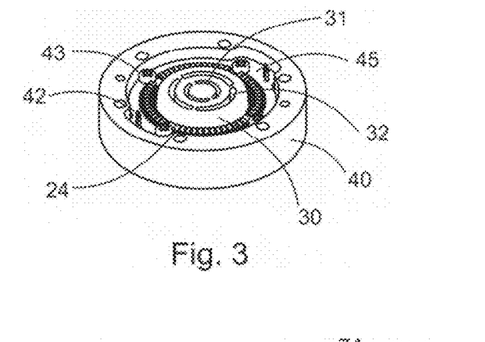
FIG. 3 is a perspective view of an embodiment of a bright-field illuminator embedded in a mask.

FIG. 3 is an isometric view of an embodiment of a bright-field illuminator embedded in a mask. The ring of multiwavelength LEDs 24, on its circuit board 45, fits, with screws 43 and guide pins 42 into collar 40, which also serves to position mask 30 with its ring slits 31 and 32 which serve to collimate green light for phase contrast illumination.

Figure 4:
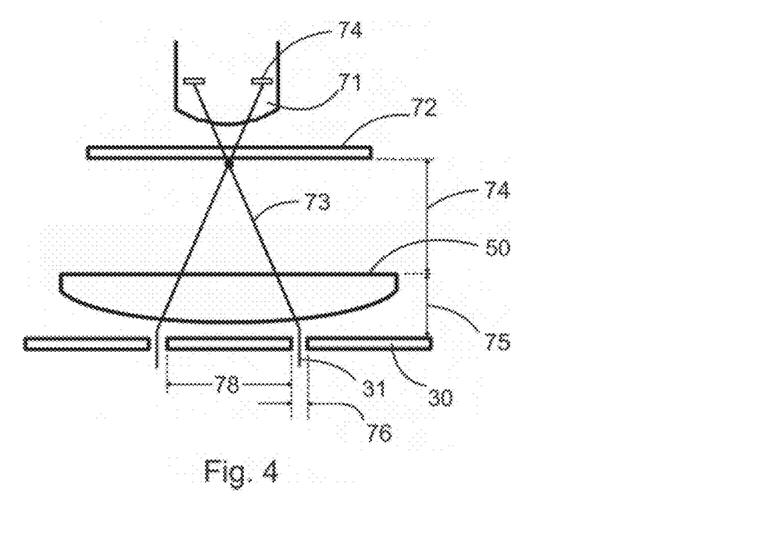
FIG. 4 is an elevation view indicating ring collimators for phase contrast conditions.

FIG. 4 is an elevation sketch (not to scale) of an embodiment of an optical pathway illustrating the principle of ring collimators for phase contrast conditions. Green light from a planar diffused source enters the annular slit 31 formed by mask 30 admitting an annular light beam with diameter 78 and width 76. The mask is positioned distance 75 below the planar surface of plano-convex lens 50, which is in turn positioned distance 74 below the microscope specimen plane 72 determined by the microscope objective lens 71. This results in traced ray 73 being focused at the specimen plane and placing a ring of light at the rear focal plane of objective lens 71, where there is an annular quarter-wave plate positioned so as to phase-shift light that is not deflected in the specimen plane 74.

Figure 5:
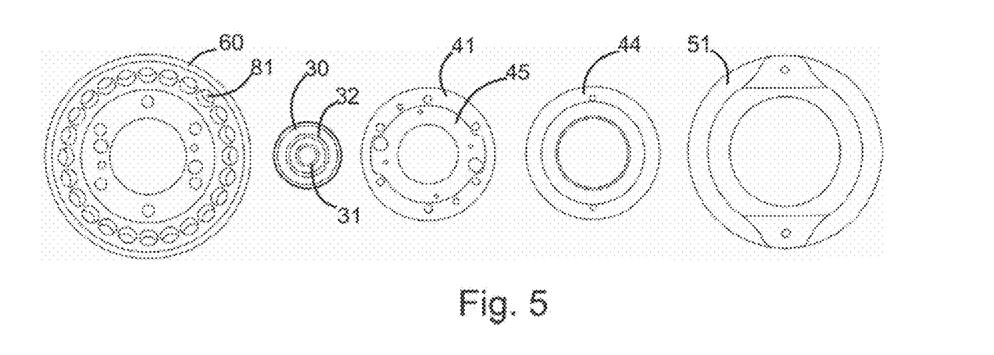
FIG. 5 is a plan view indicating collimator mask for two rings of LEDs used in phase contrast conditions and an outer ring of LEDs used for dark-field and fluorescence illumination and their corresponding masks and brackets.

FIG. 5 is a plan view indicating collimator masks and collars, in order of stacking from bottom to top, collar 60 for an outer ring of LEDs used for dark-field and fluorescence illumination with individual holes 81 for the individual encapsulated LEDs, mask 30 for two rings of LEDs used in phase contrast conditions with concentric circular slits 31 and 32. A collar 41 serves as support for circuit board 45 that accommodates LEDs for bright-field illumination. Beveled collars 44 and 51 combine to collimate light from the outermost circle of LEDs 25 that are held in place by collar 60.

Figure 6:
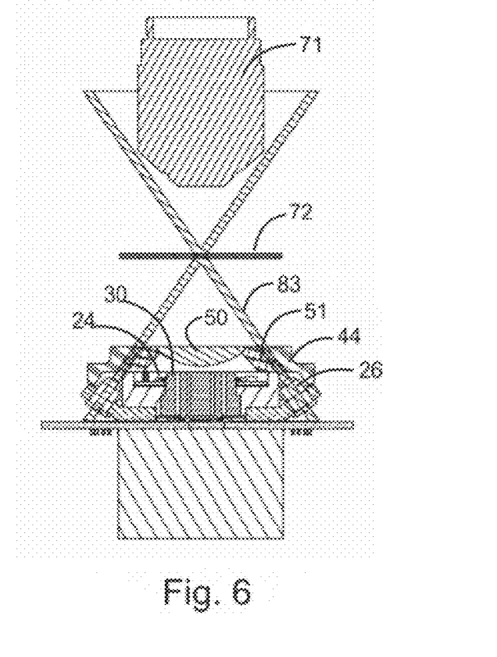
FIG. 6 is an elevation view showing optical path for dark-field and fluorescence illumination.

FIG. 6 is an elevation view showing the optical path for dark-field and fluorescence illumination drawn on an elevation view of the optical stack of a preferred embodiment. Individual LEDs 26 emit radiation that is collimated by beveled collars 44 and 51 resulting in traced ray 83 which converges at the specimen plane 72 and deposits no light directly into the microscope objective lens 71. Only light scattered or fluoresced by objects in the specimen plane will enter the objective lens. Embodiments may use this ring of single-wavelength (monochromatic) light-emitting diodes for fluorescence illumination using diodes that emit light having a wavelength that is capable of exciting fluorescence in specimens and for oblique illumination with selected diodes switched off. The monochromatic diodes, including diodes emitting different wavelengths, may be interspersed within the ring of multiwavelength diodes thereby facilitating electronic control of excitation spectra.

Not related to this process but also shown in the diagram are the plano-convex lens 50, the phase-contrast collimators 30 and the bright-field LEDs 24.

Figure 7:
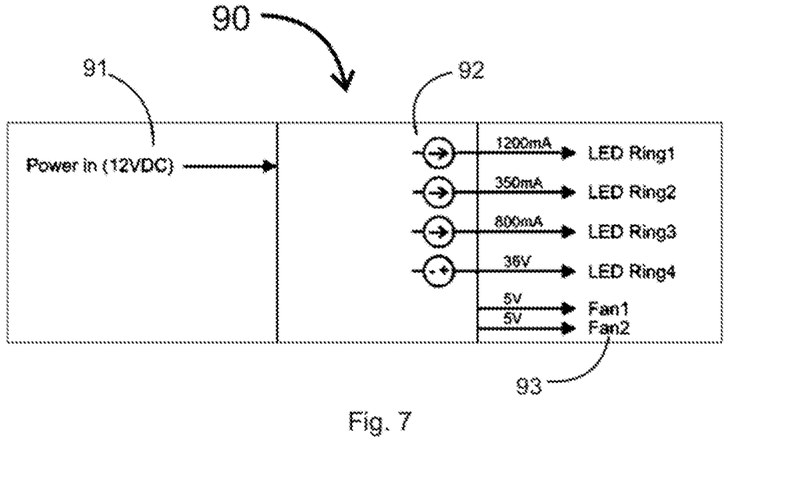
FIG. 7 is a schematic of a power architecture for an embodiment having four rings of LEDs.

FIG. 7 is a diagram of the power architecture 90 for an embodiment having four LED rings including a DC power supply 91, individually controllable inputs including intensities 92 and cooling fans 93 for the power-supply housing, which communicates to the illuminator assembly 1 by cables.

Figure 8:
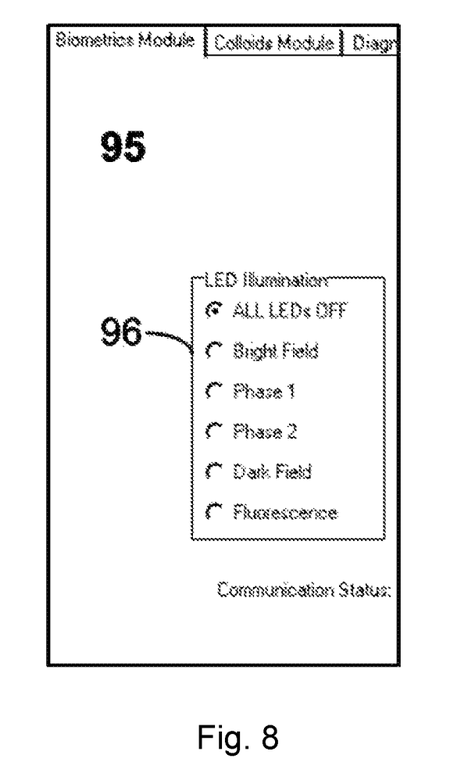
FIG. 8 is a depiction of a graphical user interface for a typical embodiment to accompany dynamic liquid sample control.

FIG. 8 is a screen view 95 of a typical graphical user interface for a typical embodiment showing mouse clicks 96 for the activation of individual illumination modes.

Figure 9:
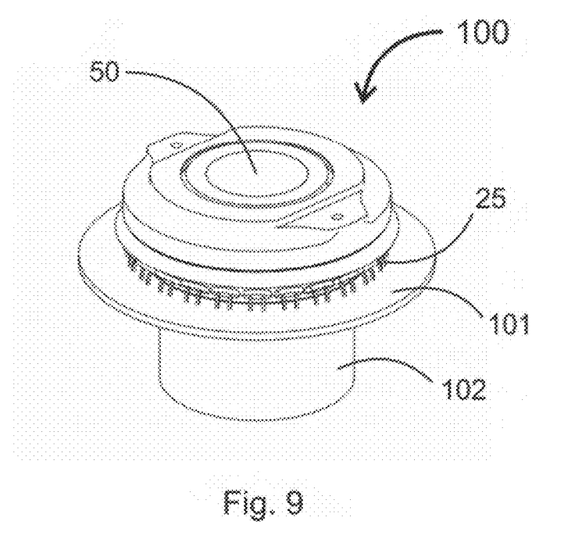
FIG. 9 is a perspective view of an embodiment for use on most upright laboratory microscopes that would have a substage condenser.

FIG. 9 is an exterior isometric view of an embodiment 100 intended for use on most upright laboratory microscopes that have a substage condenser. The locations of the plano-convex lens 50 and the outermost ring of LEDs 25 are seen. Specific adaptations include the use of a circular circuit board 101 and a cylindrical fitting 102 that fits within the substage support ring of many brands of laboratory microscopes.

It is to be broadly understood that the specification so described is subject to alternative embodiments. In particular, at least one ring of diodes may be included to facilitate use of higher-magnification phase-contrast ("Phase III") objective lenses, the outermost ring of diodes may emit light having a variety of wavelengths for a variety of applications, especially including the excitation of fluorescence in specimens and dark-field visualization of sub-wavelength objects, and certain diodes in the outermost ring 25 may be switched on and off to obtain various patterns of oblique illumination at the specimen plane. An alternative method of bright-field illumination may be achieved by the placement of an array of at least one diode at the center of the rings positioned on circuit board 20, with said diodes having switchable wavelengths to accommodate certain digital photography requirements. In an alternative embodiment circuit board 20 may be replaced by a high-intensity Organic Light-Emitting Diode (OLED) display in which rings and other patterns of light of chosen colors are produced by programming said rings and other patterns as images on said display under computer control using stored and programmed image algorithms.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the invention is not limited in its application to the details of construction and the arrangement of components set forth in the following description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

What is claimed is:

1. An integrated illuminator and condenser for microscopes, in which illuminator and condenser functions are coupled, comprising:
   a single lens wherein the number of lenses with refractive power in the integrated illuminator and condenser is equal to one, and wherein said single lens is a convergent lens;
   at least one multiwavelength light-emitting diode for bright field illumination passing through said single lens;
   a first circular array of green light-emitting diodes for low-magnification phase contrast illumination passing through said single lens;
   at least one second circular array of green light-emitting diodes for high-magnification phase contrast illumination passing through said single lens, said at least one second circular array of green light-emitting diodes for high-magnification phase contrast illumination having a diameter greater than said first circular array of green light-emitting diodes for low-magnification phase contrast illumination;
   a third circular array having at least one of multiwavelength light-emitting diodes for dark field illumination, single-wavelength light-emitting diodes for fluorescence illumination, or a combination thereof, and wherein the dark field illumination, the fluorescence illumination, or the combination thereof from said third circular array does not pass through any lens element with refractive power; and
   one or more light-absorbing annular masks having a fixed aperture geometry to limit light from one or more of said circular arrays of light-emitting diodes.

2. An illuminated microscope comprising
   a microscope having 10× and 20× phase-contrast microscope objective lenses;
   and the integrated illuminator and condenser of claim 1 wherein said first circular array of green light-emitting diodes is of a diameter for low-magnification phase contrast illumination for 10× and 20× magnification.

3. The illuminated microscope of claim 2 further comprising 40× or higher magnification phase-contrast microscope objective lenses;
   and the integrated illuminator and condenser of claim 1 wherein said diameter of said at least one second circular array of green light-emitting diodes for high-magnification phase contrast illumination is for 40× or higher magnification.

4. The integrated illuminator and condenser according to claim 1 in which said third circular array includes multi-wavelength light-emitting diodes for dark-field illumination of a diameter and includes individual light-emitting diodes so directed as to illuminate specimens with light that is obliquely incident at the specimen plane.

5. The integrated illuminator and condenser according to claim 1 in which said third circular array includes single-wavelength light-emitting diodes for fluorescence illumination of a diameter and includes individual light-emitting diodes so directed as to illuminate specimens with light that is obliquely incident at the specimen plane.

6. The integrated illuminator and condenser according to claim 1 in which said third circular array includes single-wavelength light-emitting diodes for fluorescence illumination emitting light having a wavelength that is capable of exciting fluorescence.

7. The integrated illuminator and condenser according to claim 1 in which said one or more light-absorbing annular masks form rings of light that define parallel-propagating light incident on said single lens emitted from said first circular array of green light-emitting diodes and said at least one second circular array of green light-emitting diodes.

8. The integrated illuminator and condenser according to claim 1 further including electrical switches, wherein said electrical switches activate said at least one multiwavelength light-emitting diode, said first circular array of green light-emitting diodes, said at least one second circular array of green light-emitting diodes, and said third circular array.

9. The integrated illuminator and condenser according to claim 1 further including a computer, wherein said computer activates said at least one multiwavelength light-emitting diode, said first circular array of green light-emitting diodes, said at least one second circular array of green light-emitting diodes, and said third circular array said computer being connected by cable or by wireless means.

10. The integrated illuminator and condenser according to claim 9 in which said computer is operated by screen commands using a graphical user interface.

11. The integrated illuminator and condenser according to claim 1 wherein each one of said at least one multiwavelength light-emitting diode, said first circular array of green light-emitting diodes, and said at least one second circular array of green light-emitting diodes is a planar LED source.

12. The integrated illuminator and condenser according to claim 1 wherein said one or more light-absorbing annular masks limit at least one of an inner diameter and an outer diameter of the light from one or more of said circular arrays of light-emitting diodes.

13. The integrated illuminator and condenser according to claim 1 further comprising a thin layer of light-diffusing material.

14. The integrated illuminator and condenser according to claim 1 wherein said one or more light-absorbing annular masks limits light from each one of said circular arrays of light-emitting diodes.

15. The integrated illuminator and condenser according to claim 1 wherein one or more of said light-emitting diodes are an organic-LED (OLED) display plane.

16. The integrated illuminator and condenser according to claim 15 further including a computer, wherein said computer controls said OLED display plane to produce at least one of bright-light, phase contrast, dark-field and fluorescence illumination.

17. The integrated illuminator and condenser according to claim 15 further including a computer, wherein said computer controls said OLED display plane to produce light-source images having various shapes.

18. The integrated illuminator and condenser according to claim 15 further including a computer, wherein said computer controls said OLED display plane to produce light-source images having various shapes suitable for bright field, dark field, phase contrast and fluorescence excitation illumination.

19. The integrated illuminator and condenser according to claim 15 further including a computer, wherein said computer controls said OLED display plane to produce light-source images having various spectra.

20. The integrated illuminator and condenser according to claim 19 in which said OLED display plane is controlled by said computer to produce light-source images having various spectra suitable for bright field, dark field, phase contrast and fluorescence excitation illumination.

21. An illuminated microscope comprising
a microscope including a condenser carrier;
and the integrated illuminator and condenser of claim 1 further including a mounting cylinder and a circuit board, wherein said mounting cylinder is provided below said circuit board for the purpose of mounting said integrated illuminator and condenser to said condenser carrier of said microscope.

22. An illuminated microscope comprising
a microscope including a condenser carrier;
and the integrated illuminator and condenser of claim 1 further including a mounting cylinder and a circuit board, wherein said mounting cylinder is provided above said circuit board for the purpose of mounting said integrated illuminator and condenser to said condenser carrier of said microscope.

23. An illuminated microscope comprising
a microscope including a microscope body and a specimen plane;
and the integrated illuminator and condenser of claim 1.

24. The integrated illuminator and condenser according to claim 1 further comprising at least one circular array of a plurality of said at least one multiwavelength light-emitting diodes for bright field illumination.

25. The integrated illuminator and condenser according to claim 1 wherein said single lens, said at least one multiwavelength light-emitting diode, said first circular array, said second circular array, and said third circular array are fixed relative to each other.

* * * * *